May 2, 1939.  E. BABCOCK  2,156,908
ABSORBER FOR REFRIGERATING SYSTEMS
Filed June 3, 1935
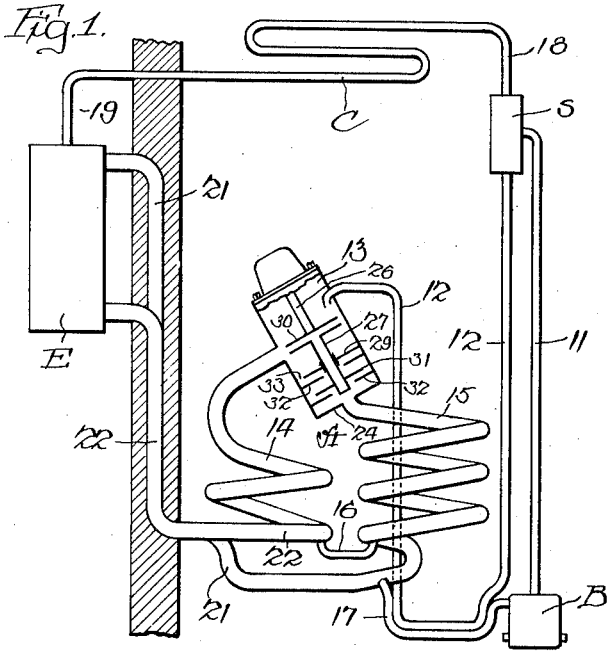
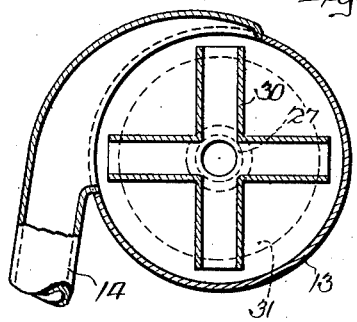
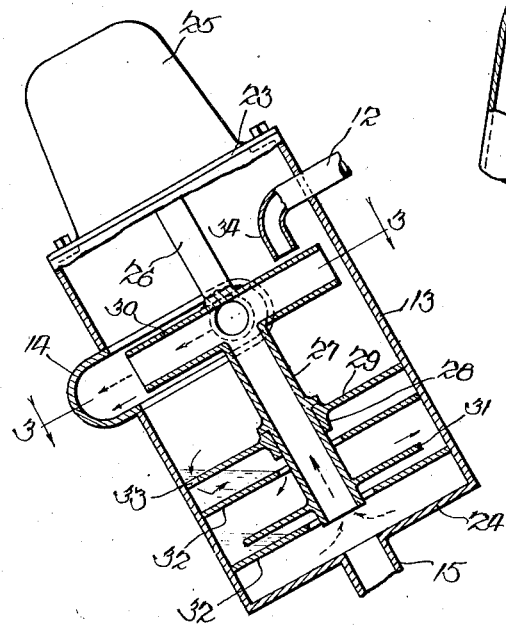
Inventor:
Earl Babcock
By Harry S. Dumarre
Atty.

Patented May 2, 1939

2,156,908

UNITED STATES PATENT OFFICE 2,156,908

ABSORBER FOR REFRIGERATING SYSTEMS

Earl Babcock, Evanston, Ill., assignor to The Hoover Company, North Canton, Ohio, a corporation of Ohio Application June 3, 1935, Serial No. 24,625

24 Claims. (Cl. 62—119.5)

This invention relates to continuous absorption refrigerating systems of the type in which an inert gas is employed and more particularly to the absorbers adapted for use therein.

In the U. S. patent to Nelson, et al., No. 1,993,380, granted March 5, 1935, a continuous absorption refrigeration is disclosed in the which an absorber having two parts is employed, the absorption solution supplied thereto being divided into two streams and conveyed through the two parts of the absorber.

It is an object of the present invention to provide an absorber having two parts, somewhat like that disclosed in the above mentioned patent, and in which absorption solution supplied thereto is divided into two streams so as to flow through said parts, in a novel manner.

It is another object of the invention to provide novel means for circulating inert gas through the absorber and the associated vessels of a continuous absorption refrigerating system and to provide means for bringing gases and absorption liquid into intimate contact in the absorber.

Other objects reside in certain novel features of the arrangement and construction of parts as will be apparent from the following description taken in connection with the accompanying drawing, in which Figure 1 is a diagrammatic representation of a continuous absorption refrigerating system in which an absorber constructed in accordance with the present invention is incorporated;

Figure 2 is a vertical cross-sectional view of the solution dividing and gas circulating means shown in the arrangement of Figure 1; and Figure 3 is a transverse cross-sectional view of the device shown in Figure 2, the view being taken on the line 3—3 thereof.

Referring to the drawing in detail and first to the diagrammatic illustration of Figure 1, it will be seen that a continuous absorption refrigerating system is illustrated as consisting of a boiler B, gas separating chamber S, a condenser C, an evaporator E, and an absorber represented generally by the reference character A, as essential elements, these parts being connected by various conduits to form a complete refrigerating system.

The boiler B is connected to the gas separation chamber S by means of the conduit 11 which may act as a gas lift pump to convey absorption liquid and refrigerant gas generated in the boiler into the gas separation chamber S. From this chamber the absorption liquid flows through the conduit 12 into the top of a vessel 13 which is part of the absorber and which will be described in detail hereinafter. In addition to the vessel 13, the absorber includes two coils of pipe designated 14 and 15, these being connected at their lower ends by means of a small U-shaped conduit 16. The absorption liquid supplied to vessel 13 flows downwardly, by gravity, through the coils 14 and 15 and returns to the boiler B through a conduit 17. A portion of the conduits 12 and 17 may be in heat exchange relation as illustrated in Figure 1.

Gas generated in boiler B, the conduit 11, or the gas separation chamber S, passes through a conduit 18 to the condenser C where it may be liquefied and conveyed into the evaporator E through the conduit 19.

Two inert gas conduits designated 21 and 22 connect the evaporator to the absorber. The conduit 21 connects the top of the evaporator to the lower portion of the coil 15. The gas conduit 22 connects the lower portion of the evaporator to the lower end of the coil 14.

Since the top of coils 14 and 15 are connected to the vessel 13, the coil 15 to the lower end of that vessel 13 and the coil 14 to the side thereof, as illustrated in Figure 1, a circuit for the inert gas in the system is provided. This circuit includes the evaporator E, gas conduit 21, the coil 15, the vessel 13, the coils 14, and the conduit 22. If inert gas is circulated over this circuit the refrigerant supplied to the evaporator in liquid form will be evaporated and conveyed into the absorber where it will be absorbed in the absorption liquid trickling therethrough and be conveyed back to the boiler in accordance with known practices.

Water may be used as the absorption liquid in the system, ammonia as refrigerant, and hydrogen as the inert gas.

The vessel 13 and the apparatus mounted therein constitutes means for circulating the inert gas just described and also constitutes a liquid divider or means for dividing the absorption liquid supplied to this vessel through the conduit 12 into two streams, one of which flows through the coil 14 and the other through the coil 15.

As shown in detail in Figures 2 and 3, the vessel 13 may consist of a cylinder disposed in an inclined position and provided with end plates 23 and 24. An electriec motor 25 which may be of any suitable construction, but is preferably hermetically sealed to the vessel 13, is mounted on the upper end plate 23 and is adapted to rotate shaft 26 which extends downwardly through the center of the vessel 13.

The lower portion 27 of the shaft 26 is hollow and it may be supported in a bearing 28 mounted on a plate 29 which extends transversely across the vessel 13. The hollow portion of the shaft 27 opens into a double T-shaped conduit 30, this conduit having arms which have a radius only slightly smaller than the radius of the vessel 13.

The lower portion of the hollow shaft 27 may have a disk 31 mounted integrally thereon and adapted to rotate therewith, and plates or baffles 32 may be mounted within the lower portion of the vessel to co-operate with the rotating disk 31 to bring the gases and liquid in the vessel 13 into intimate contact in the lower portion thereof.

If desired the plate 29 in the vessel 13 may have an opening only at its lower edge as illustrated at 33 so that this plate may co-operate with the plate 32 immediately beneath it to provide a liquid seal which prevents the passage of gas from the upper portion to the lower portion of the vessel 13.

The conduit 12 which supplies absorption liquid to the vessel 13 has a small spout 34 thereon which is located at some convenient point above the double T conduit 30.

The operation of the absorber is as follows: Upon the electric motor 25 being energized the shaft 26 rotates. Since the double T arrangement 30 is integral with the shaft 26, it also rotates and in so doing acts as a double shrouded fan to cause gas to pass upwardly through the hollow portion 27 of the shaft and leave the vessel 13 through the conduit 14, the upper portion of which may be so connected to the vessel 13 as to form a volute into which the gas is discharged. In this way gas is sucked from the coil 15 and discharged into the coil 14 so that it flows through the evaporator and the absorber over the circuit described above.

At the same time that the inert gas is being circulated as described above, absorption liquid flowing by gravity from the gas separation chamber S into the vessel 13, is discharging from the spout 34. Since the double T arrangement 30 is rotating, some of this liquid drips upon this T arrangement and is thrown radially by it into the volute of the conduit 14. The volute of the conduit 14 thus acts as a receptacle for one portion of the liquid stream falling from the spout 34 onto the rotor 30. This portion then flows through the coil 14 under the influence of gravity. Another portion of the absorption liquid dripping from the spout 34 either falls through the double T arrangement 30, or drips thereon and is thrown outwardly, to the right as viewed in Figure 2, so as to trickle downwardly through the vessel 13, the lower part of which constitutes a second receptacle. As it passes downwardly through vessel 13, it may be sprayed about by the disk 31 so as to have an intimate contact with the gases therein. It then flows downwardly through the coil 15 under the influence of gravity.

The absorption liquid flowing through the coil 14 passes through the conduit 16 and unites with the stream of liquid flowing through the coil 15, all of the absorption liquid then returning to the boiler B through the conduit 17.

The arrangement illustrated in the drawing is particularly suitable for use in a continuous absorption refrigerating system which is air-cooled. For purposes of clarity in illustrating, no heat discharging surfaces are shown in the drawing, but it will be readily understood that the condenser C, the vessel 13, and the coils 14 and 15 may be provided with heat-radiating fins or other suitable means for discharging the heat therefrom.

It is to be noted that the absorber illustrated has the advantages common to absorbers having more than one part. The greater part of the absorption takes place in the coil 15 and the vessel 13. Since the coil 14 may operate at a lower temperature than either coil 15 or vessel 13, however, and since the absorption liquid supplied thereto may have a low concentration, coming almost directly from the boiler, the coil 14 may act to strip or remove some refrigerant gas from the inert gas passing back to the evaporator to a degree greater than would be possible in the coil 15 and vessel 13.

The use of coils for the main parts 14 and 15 of the absorber instead of vessels having less resistance to gas flow, is rendered possible because of the fact that the gas circulating means in the vessel 13 is capable of overcoming considerable resistance to flow. It is of course within the scope of the invention to use vessels of any desirable type in place of the coils 14 and 15 however. Various other changes in the arrangement and construction of parts may be made without departing from the spirit of the invention or the scope of the annexed claims.

I claim:

1. In an absorption refrigerating system, an absorber having a plurality of parts, means for supplying absorption liquid to said absorber, rotating means for dividing the absorption liquid into a plurality of streams, and means for conveying the streams into different parts of said absorber.

2. In an absorption refrigerating system, an absorber having a plurality of parts, means for supplying absorption liquid to said absorber and for removing absorption liquid therefrom, means for supplying inert gas to said absorber and for removing inert gas therefrom, power driven means for causing inert gas to circulate through said absorber and for dividing the absorption liquid supplied to said absorber into a plurality of streams, and means for conveying the streams into different parts of said absorber.

3. An absorber adapted for use in an absorption refrigerating system, said absorber including a vessel, means for supplying absorption liquid to said vessel, power driven rotating means for dividing the absorption liquid supplied to said vessel into a plurality of streams, and means for conveying the divided streams away from said vessel independently of one another.

4. An absorber adapted for use in an absorption refrigerating system using inert gas, said absorber including a unitary arrangement for circulating inert gas and for dividing absorption liquid into a plurality of streams, said arrangement including a vessel, means for supplying inert gas thereto, power driven rotary means adapted to operate as a centrifugal fan to drive the inert gas, means for supplying absorption liquid to said vessel at a point above said power driven rotary means, and a plurality of liquid catching devices in said vessel, the arrangement being such that the absorption liquid supplied to said vessel is caused to be distributed into said catching devices as a result of the operation of said power driven rotary means.

5. An absorber adapted for use in an absorption refrigerating system using inert gas, said absorber including a unitary arrangement for circulating inert gas and for dividing absorption liquid into a plurality of streams, said arrangement including a vessel, means for supplying inert gas thereto, power driven rotary means adapted to operate as a centrifugal fan to drive the inert gas, means for supplying absorption liquid to said vessel at a point above said power driven rotary means, and a plurality of liquid catching devices in said vessel, the arrangement being such that the absorption liquid supplied to said vessel is caused to be distributed into said catching devices as a result of the operation of said power driven rotary means, and said power driven rotary means consisting of a double T conduit disposed at right angles to, and connected with a hollow shaft.

6. An absorber adapted for use in an absorption refrigerating system using inert gas, said absorber having a plurality of parts, power driven means for circulating inert gas through said parts in series and for dividing absorption liquid supplied to one of said parts into a plurality of streams whereby the liquid may flow through others of said parts in parallel.

7. An absorber adapted for use in an absorption refrigerating system using inert gas, said absorber having a plurality of parts, two of which consist of coils of pipe and a third of which consists of a vessel having power driven means therein for circulating inert gas through the absorber and for dividing absorption liquid supplied thereto into a plurality of streams and for conveying the streams to the coils, whereby the liquid may flow through said coils in parallel.

8. An absorber adapted for use in an absorption refrigerating system using inert gas, said absorber having two parts and a power driven device associated with said parts for causing inert gas to circulate through said parts and for dividing a stream of absorption liquid into two streams and for supplying said two streams to the two parts of the absorber.

9. The method of operating an absorber device in an absorption refrigeration system of the type employing a refrigerant, an absorption fluid and a pressure equalizing medium comprising sub-dividing weak absorption fluid into two main bodies, passing a rich mixture of refrigerant and pressure equalizing medium in gaseous phase in counterflow over one of said bodies of absorption fluid, then passing the resultant lean mixture of gases over the other body of absorption fluid whereby the mixture is stripped of additional refrigerant, and then uniting said two bodies of absorption fluid.

10. The method of operating an absorber device in an absorption refrigeration system of the type employing a refrigerant, an absorption medium and a pressure equalizing medium, comprising sub-dividing absorption medium into two bodies by centrifugal action, maintaining each of said bodies in heat exchange relation with a cooling medium, passing a pressure equalizing medium containing refrigerant in counterflow to and in intimate contact with one of said bodies, passing the weakened mixture of refrigerant and equalizing medium into intimate contact with the second of said bodies, and then uniting said two bodies of absorption fluid.

11. The method of operating an absorber device in an absorption refrigeration system using a refrigerant, an absorption fluid and a pressure equalizing medium comprising sub-dividing weak absorption fluid into two streams by centrifugal action, further sub-dividing one of said streams into a spray and small particles, passing a rich mixture of the pressure equalizing medium and refrigerant in counterflow to but in intimate contact with said last mentioned stream whereby a considerable portion of the refrigerant is absorbed, and then passing the weakened mixture into intimate contact with the second stream of absorption medium whereby additional refrigerant is stripped therefrom.

12. The method of operating an absorber device in an absorption refrigeration system employing a refrigerant, an absorption medium therefor, and a pressure equalizing medium comprising sub-dividing weak absorption medium into two streams, passing said streams into heat exchange relation to a cooling medium, further sub-dividing one of said streams into a spray of small particles to facilitate the cooling thereof, passing a rich mixture of the refrigerant and pressure equalizing medium into intimate contact with said last mentioned stream whereby a major portion of refrigerant is absorbed by the absorption medium, and then passing said mixture into intimate contact with the second cooled stream of absorbent medium whereby additional refrigerant is stripped therefrom.

13. The method of separating a mixture of two mediums in gaseous phase by the process of absorption which comprises passing said mixture into intimate contact with but in counterflow to a stream of finely divided absorption fluid for one of said mediums to absorb the major portion of said one medium at a high temperature, while maintaining all of said mediums in heat exchange relation but out of contact with a cooling medium, and then passing the mixture into intimate contact with a cooled and different stream of absorption fluid whereby virtually all of the remaining portion of said one medium is stripped from said mixture at a low temperature.

14. The method of separating a mixture of two mediums in gaseous phase by the process of absorption which comprises establishing two turbulent parallel streams of absorption medium in heat exchange relation with a cooling medium, passing said mixture in counterflow to and in intimate contact with one of said streams for the purpose of absorbing the major portion of one of said first mentioned mediums at a relatively high temperature, dissipating the heat of absorption to said cooling medium at a relatively high temperature, then passing the depleted mixture into absorbing relation with said second stream for the purpose of removing additional medium from said mixture at a relatively low temperature, and dissipating the heat of absorption to said cooling medium at a relatively low temperature.

15. The method of operating an absorption refrigeration system of the type having a boiler, condenser, evaporator and an absorber, and employing a refrigerant, an absorbent therefor, and a pressure equalizing medium, said method comprising applying heat to rich absorbent to drive off refrigerant, condensing said refrigerant and then allowing the same to evaporate into a pressure equalizing medium to produce refrigeration, conducting this mixture successively into intimate contact with but in counterflow to a first stream of lean absorbent, dissipating the exothermic heat of absorption to a cooling medium, then passing the mixture into absorbing relation to a second cooled stream of absorbent to strip the mixture of refrigerant, and returning the equalizing medium to the evaporation zone, and the two streams of rich absorbent to the heated zone whereby the foregoing cycle may be repeated continuously.

16. The method of operating an absorption refrigeration system of the type having a boiler, condenser, evaporator, and an absorber, and employing a refrigerant, an absorbent therefor, and a pressure equalizing medium, said method comprising applying heat to rich absorbent to liberate refrigerant, condensing said refrigerant, permitting the refrigerant to expand into a pressure equalizing medium, separating lean absorbent into two streams by centrifugal action and returning said streams by gravity in a tortuous circuit to the heating zone, passing said mixture of refrigerant and equalizing medium into intimate contact with but in counterflow to one of said streams of absorbent medium, dissipating the exothermic heat of absorption to the atmosphere, passing the mixture into absorbing relation with the other stream of absorbent whereby the mixture may be stripped of refrigerant, and then returning the pressure equalizing medium to the evaporating zone.

17. In an absorption refrigeration system of the type using a refrigerant, an absorbent therefor, and a pressure equalizing medium, said system having a boiler, a condenser, an evaporator and an absorber connected by means providing a refrigerant circuit, a pressure equalizing circuit and an absorbent circuit, said system being characterized by the fact that said absorber comprises two parts and includes power driven means positioned to divide the absorbent into two bodies directed into each of said parts, and operable to circulate the pressure equalizing medium over its circuit and through both of said absorber parts.

18. In an absorption refrigeration system of the type using a refrigerant, an absorbent therefor, and a pressure equalizing medium, said system having a generator, a condenser, an evaporator, and an absorber connected by means providing a refrigerant circuit, a pressure equalizing circuit and an absorbent circuit, said system being characterized by the fact that said absorber comprises two parts and includes power driven means positioned to divide the lean absorbent into two streams directed into each of said parts and operable to circulate the pressure equalizing medium through one of said parts in counterflow to the absorbent stream, and through the other part in the same direction as the absorbent stream.

19. In an absorption refrigeration system of the type using a refrigerant, an absorbent therefor, and a pressure equalizing medium, said system having a generator, a condenser, an evaporator, and an absorber connected by means providing a refrigerant circuit, a pressure equalizing circuit and an absorbent circuit, said system being characterized by the fact that said absorber is divided into two branches communicating at their opposite ends, and power driven means at one of said junctions operable to apportion the lean absorbent between said branches and to circulate the pressure equalizing medium successively through each of said branches, said means also including means to facilitate intimate contact between all the mediums in the system flowing through one of said branches.

20. Absorption refrigerating apparatus comprising an absorption solution circuit including a generator and an absorber, a refrigerant circuit including said generator, said absorber, and an evaporator, said refrigerant circuit including means for supplying refrigerant generated in said generator to said evaporator in liquid phase, means for separating liquid into a plurality of bodies by centrifugal action, and means in one of said circuits for supplying liquid to said separating means, said separating means being constructed and arranged to separate liquid into a plurality of bodies independently of changes in the angular position of said apparatus.

21. Absorption refrigerating apparatus comprising an absorption solution circuit including a generator and an absorber, a refrigerant circuit including said generator, said absorber, and an evaporator, said refrigerant circuit including means for supplying refrigerant generated in said generator to said evaporator in liquid phase, means comprising a power driven movable element for separating liquid into a plurality of bodies, and means in one of said circuits for supplying liquid to said separating means, said separating means being constructed and arranged to separate liquid into a plurality of bodies independently of the liquid level in said supply means.

22. That improvement in the art of refrigeration which includes the steps of evaporating refrigerant from solution, liquefying the vapor, evaporating the vapor to produce refrigeration, conveying absorbing solution to a dividing zone, applying divergent forces to the solution in such dividing zone by means of a self-contained power actuated divider to divide the solution into a plurality of streams, and contacting one of said streams of solution with refrigerant vapor.

23. Refrigerating apparatus comprising a liquid circuit, a gas circuit, a plurality of vessels in each of said circuits, power driven means for simultaneously circulating the gas through the gas circuit and for dividing the liquid flowing through the liquid circuit into a plurality of bodies and means for directing said bodies of liquid into different vessels.

24. Refrigerating apparatus comprising a generator, an evaporator, an absorber, means forming a gas circuit including the evaporator and absorber, means for circulating an inert gas through said circuit, means forming a refrigerant circuit including said generator, evaporator and absorber, means forming a solution circuit including said absorber and said generator, power driven rotating liquid dividing means in one of said circuits, and means for conveying divided bodies of liquid to different portions of said one circuit independently of one another.

EARL BABCOCK.